(12) United States Patent
Grehn et al.

(10) Patent No.: US 10,481,350 B1
(45) Date of Patent: Nov. 19, 2019

(54) THROUGH-BOARD OPTICAL ASSEMBLY (71) Applicant: Sicoya GmbH, Berlin (DE)

(72) Inventors: Moritz Grehn, Berlin (DE); Marco Vitali, Berlin (DE); Sebastian Höll, Berlin (DE); Andreas Hakansson, Berlin (DE); Chenhui Jiang, Berlin (DE)

(73) Assignee: Sicoya GmbH, Berlin (DE)

( * ) Notice: Subject to any disclaimer, the term of this patent is extended or adjusted under 35 U.S.C. 154(b) by 0 days.

(21) Appl. No.: 16/217,025

(22) Filed: Dec. 11, 2018

(51) Int. Cl.
*G02B 6/42* (2006.01)

(52) U.S. Cl.
CPC ......... *G02B 6/4214* (2013.01); *G02B 6/4206* (2013.01); *G02B 6/4212* (2013.01)

(58) Field of Classification Search
CPC ... G02B 6/4214; G02B 6/4212; G02B 6/4206
See application file for complete search history.

(56) References Cited

U.S. PATENT DOCUMENTS

| | | | | |
|---|---|---|---|---|
| 6,450,704 B1* | 9/2002 | O'Connor | ............ | G02B 6/4201 385/52 |
| 6,729,776 B2* | 5/2004 | O'Connor | ............ | G02B 6/4201 385/88 |
| 6,843,608 B2* | 1/2005 | O'Connor | ............ | G02B 6/4201 385/91 |
| 7,162,124 B1 | 1/2007 | Gunn, III et al. | | |
| 9,720,188 B2* | 8/2017 | Barwicz | ............... | G02B 6/3893 |
| 9,835,804 B2* | 12/2017 | Barwicz | ............... | G02B 6/3893 |
| 10,073,223 B2* | 9/2018 | Barwicz | ............... | G02B 6/3893 |
| 10,181,628 B2* | 1/2019 | Dreps | ........................ | H01P 3/16 |
| 10,228,525 B2* | 3/2019 | Barwicz | .................... | G02B 6/30 |
| 2002/0041740 A1* | 4/2002 | O'Connor | ............ | G02B 6/4201 385/89 |
| 2002/0197024 A1* | 12/2002 | O'Connor | ............ | G02B 6/4201 385/89 |
| 2004/0208461 A1* | 10/2004 | O'Connor | ............ | G02B 6/4201 385/92 |
| 2017/0192181 A1* | 7/2017 | Barwicz | ............... | G02B 6/3893 |
| 2017/0199337 A1* | 7/2017 | Barwicz | ............... | G02B 6/3893 |
| 2018/0052285 A1* | 2/2018 | Barwicz | ............... | G02B 6/3893 |
| 2018/0115043 A1* | 4/2018 | Dreps | ........................ | H01P 3/16 |

FOREIGN PATENT DOCUMENTS

| | | |
|---|---|---|
| EP | 0 689 071 A1 | 12/1995 |
| EP | 1 481 274 B1 | 4/2006 |

* cited by examiner

*Primary Examiner* — Andrew Jordan
(74) *Attorney, Agent, or Firm* — Gordon Rees Scully Mansukhani, LLP (57) ABSTRACT

An embodiment of the invention relates to an optical assembly comprising a circuit board comprising a first side, a second side, and at least one hole that extends through the circuit board, a photonic chip having a front side and a back side, the front side of the photonic chip being mounted on the first side of the circuit board and electrically connected to at least one electrical conductor of the circuit board, at least one component being mounted on the front side of the photonic chip opposite the hole and protruding from the front side of the photonic chip into the hole or through the hole, and a wave-guiding element that is located on the second side of the circuit board and optically coupled to the photonic chip through said hole.

20 Claims, 11 Drawing Sheets

THROUGH-BOARD OPTICAL ASSEMBLY

The invention relates to optical assemblies and methods of fabricating optical assemblies.

BACKGROUND OF THE INVENTION

An optical assembly is disclosed for instance in the European Patent Application EP 0 689 071 A1. The optical assembly comprises a ceramic base, a photodetector, a lens and a waveguide.

OBJECTIVE OF THE PRESENT INVENTION

An objective of the present invention is to provide a compact optical assembly.

A further objective of the present invention is to provide a method of fabricating a compact optical assembly.

BRIEF SUMMARY OF THE INVENTION

An embodiment of the present invention relates to an optical assembly comprising a circuit board comprising a first side, a second side, and at least one hole that extends through the circuit board, a photonic chip having a front side and a back side, the front side of the photonic chip being mounted on the first side of the circuit board and electrically connected to at least one electrical conductor of the circuit board, at least one component being mounted on the front side of the photonic chip opposite the hole and protruding from the front side of the photonic chip into the hole or through the hole, and a wave-guiding element that is located on the second side of the circuit board and optically coupled to the photonic chip through said hole.

According to this embodiment of the invention, the hole provides dual functionality. The hole accommodates the at least one component that is mounted on the front side of the photonic chip, and also allows optical coupling between the photonic chip and the wave-guiding element that is located on the other side of the circuit board. The dual functionality of the hole allows a very compact design of the entire assembly.

Said at least one component or at least one of said components is preferably a heat spreader.

Alternatively or additionally, the at least one component or at least one of said components may be a heat generating component. The heat generating component may be a radiation emitter, such as a laser or LED, an amplifier, or a photodetector.

A first heat sink is preferably mounted to the back side of the photonic chip.

A second heat sink is preferably mounted on said component.

The optical assembly may further comprise a housing having a first wall that faces the first side of the circuit board and therefore the back side of the photonic chip, and a second wall that faces the second side of the circuit board.

The first heat sink is preferably coupled to the first wall and the second heat sink is preferably coupled to the second wall.

Heat generated by and/or passing (guided by) the component preferably flows through the hole and the second heat sink towards the second wall.

The lens device is preferably configured to transmit radiation between the wave-guiding element and the photonic chip. The lens device and the wave-guiding element are preferably connected to each other and form a self-contained optical connector.

The lens device preferably comprises a first outer surface and a second outer surface opposite the first outer surface.

The first outer surface is preferably connected to the wave-guiding element and the second outer surface is preferably connected to the photonic chip.

The surface shape of the first surface preferably forms at least one lens.

The lens device is preferably located in said hole adjacent to said at least one component.

The wave-guiding element preferably comprises a base element, an optical waveguide, and a lid covering the optical waveguide.

The lens device is preferably located between the lid and the photonic chip.

According to a preferred embodiment, the base element may have at least one groove, wherein the optical waveguide may be an optical fiber located in said groove.

According to another preferred embodiment, the optical waveguide may be an integrated waveguide that is integrated in the base element or integrated in a layer deposited on the base element.

The wave-guiding element preferably comprises a facet having an angle between 44° and 55° relative to an axis that is perpendicular to the front side of the photonic chip.

The facet is preferably capable of reflecting radiation that originates from the photonic chip and passes the lid and a waveguide's cladding, into a waveguide's core and/or reflecting radiation that propagates through the waveguide's core towards the facet, from the waveguide's core into the waveguide's cladding towards the lid and the photonic chip.

The lid preferably consists of semiconductor material (e.g. silicon).

The first outer surface of the lens device is preferably soldered or glued to the lid.

The ratio between the propagation length of a first optical path that extends through the lens device, and the propagation length of a second optical path that extends through the lid and the waveguide's cladding to the waveguide's core, is preferably between 1:1 and 3:1.

The thicknesses of the lid and the lens device preferably fulfil the following equations:

$$D2/n2 = Df/nf + D1/n1$$

$$0.8 < D2/n2/(Df/nf + D1/n1) < 1.2$$

wherein
D1 describes the thickness of the lid,
n1 describes the refractive index of the lid,
D2 describes the thickness of the lens device,
n2 describes the refractive index of the lens device,
Df describes the distance between the center of the waveguide's core and the lid, and
nf describes the refractive index of the waveguide's cladding.

Alternatively or additionally, the thicknesses of the lid and the lens device may fulfil the following equations:

$$MFD1 * D2/n2 = MFD2 * (Df/nf + D1/n1)$$

$$0.8 < MFD1 * D2/n2/(MFD2 * (Df/nf + D1/n1)) < 1.2$$

wherein
D1 describes the thickness of the lid,
n1 describes the refractive index of the lid,
D2 describes the thickness of the lens device, n2 describes the refractive index of the lens device,
Df describes the distance between the waveguide's core and the lid,
nf describes the refractive index of the waveguide's cladding,
MFD1 describes the 1/e2-intensity related mode field diameter of a coupling element integrated in said photonic chip, and
MFD2 describes the 1/e2-intensity related mode field diameter of the waveguide.

According to another exemplary embodiment, the photonic chip may comprise an inner wave-guiding layer and an integrated coupling element.

The wave-guiding element is preferably optically coupled to the inner wave-guiding layer via the integrated coupling element.

The layer stack (e.g. backend of line) of the photonic chip is preferably located on top of an inner wave-guiding layer of the photonic chip.

The lens device is preferably glued to the layer stack.

The coupling element is preferably integrated in the inner wave-guiding layer.

The ratio between the propagation length of a first optical path that extends from the coupling element through the layer stack and the lens device to a first surface of the lens device, and the propagation length of a second optical path that extends from the first surface of the lens device through the lid and the waveguide's cladding to waveguide's core, is preferably between 1:1 and 3:1.

The thicknesses of the lid, the lens device and the layer stack preferably fulfil the following equations:

$$MFD1*(D3/n3+D2/n2)=MFD2*(Df/nf+D1/n1)$$

$$0.8<MFD1*(D3/n3+D2/n2)/(MFD2*(Df/nf+D1/n1))<1.2$$

wherein
D1 describes the thickness of the lid,
n1 describes the refractive index of the lid,
D2 describes the thickness of the lens device,
n2 describes the refractive index of the lens device,
D3 describes the thickness of the layer stack,
n3 describes the refractive index of the layer stack,
Df describes the distance between the waveguide's core and the lid,
nf describes the refractive index of the waveguide's cladding,
MFD1 describes the 1/e2-intensity related mode field diameter of a coupling element integrated in the inner wave-guiding layer of the photonic chip, and
MFD2 describes the 1/e2-intensity related mode field diameter of the waveguide.

According to a further embodiment of the invention, the wave-guiding element may comprise a fiber having a straight section that is parallel to the circuit board and located on the second side of the circuit board, and a bent section that protrudes into the hole towards the photonic chip.

An end facet of the bent section is preferably glued to the photonic chip.

Said at least one lens or at least one of the lenses is preferably an aspheric lens.

The first surface of the lens device may form a plurality of lenses that differ from one another.

A gap between the inner wall of the hole and the lens device and/or a gap between the inner wall of the hole and the component and/or a gap between the lens device and the component are preferably filled with a filling material (e.g. light or temperature curing adhesives, preferably based on epoxy resin or acrylates).

A further embodiment of the invention relates to a method of fabricating an optical assembly comprising the steps of:
 forming at least one through-hole in a circuit board that comprises a first side and a second side,
 mounting at least one component on a front side of a photonic chip,
 mounting the photonic chip with its front side on the first side of the circuit board and electrically connecting at least one electrical contact of the photonic chip to at least one electrical conductor of the circuit board, wherein the photonic chip is aligned such that said at least one component protrudes from the front side of the photonic chip into the hole or through the hole, and
 arranging a wave-guiding element on the second side of the circuit board and optically coupling the wave-guiding element to the photonic chip by forming an optical path through said hole.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
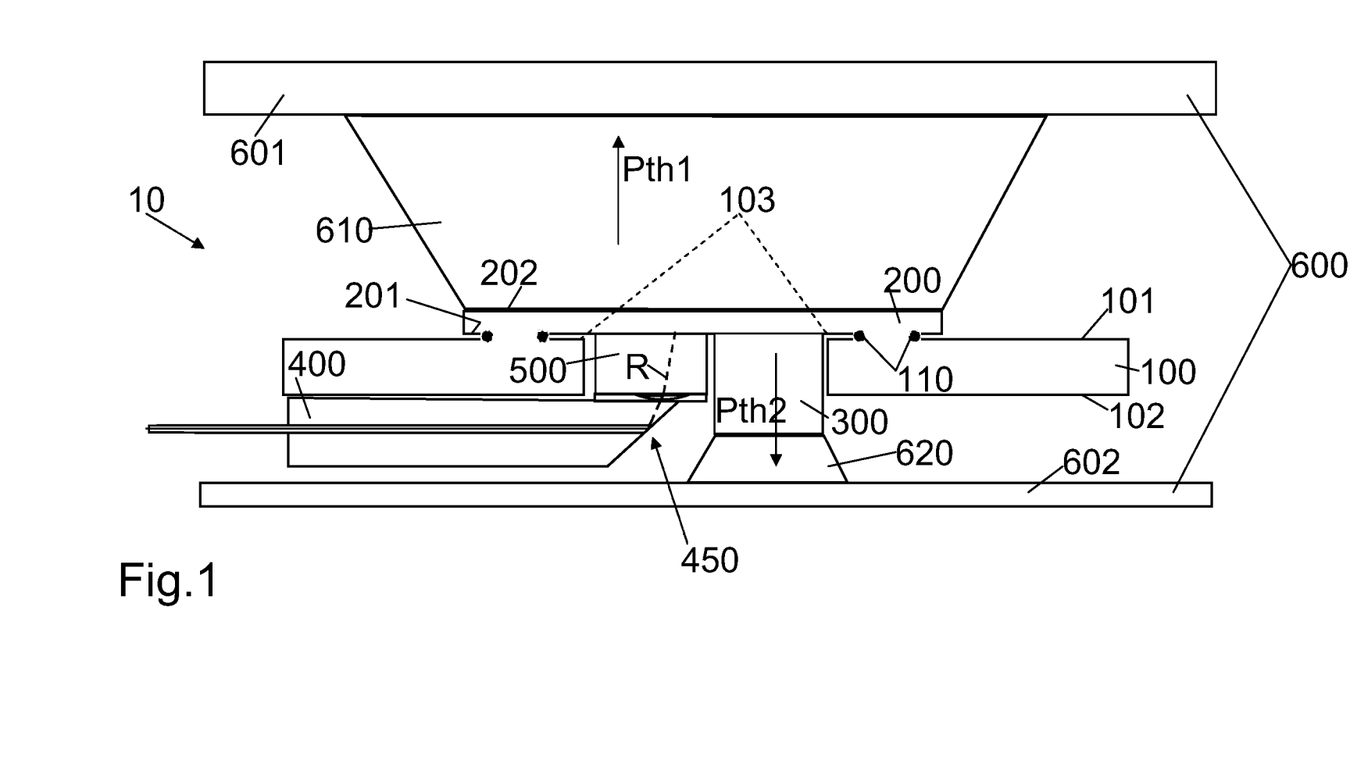
FIG. 1 illustrates an exemplary embodiment of an optical assembly according to the present invention.

FIG. 1 shows (not drawn to scale) an exemplary embodiment of an optical assembly 10 according to the present invention. The optical assembly 10 comprises a circuit board 100 having a first side 101, a second side 102, and at least one hole 103 that extends through the circuit board 100.

A photonic chip 200 of the optical assembly 10 comprises a front side 201 and a back side 202. The front side 201 of the photonic chip 200 is mounted on the first side 101 of the circuit board 100 and electrically connected to one or more electrical conductors 110 of the circuit board 100.

At least one component 300 of the optical assembly 10 is mounted on the front side 201 of the photonic chip 200 opposite the hole 103. The component 300 protrudes from the front side 201 of the photonic chip 200 through the hole 103.

A wave-guiding element 400 of the optical assembly 10 is located on the second side 102 of the circuit board 100 and optically coupled to the photonic chip 200 through the same hole 103 where the component 300 is located. To this end, the optical assembly further comprises a lens device 500 that is configured to transmit radiation between the wave-guiding element 400 and the photonic chip 200. The lens device 500 is located inside the hole 103 adjacent to the component 300 and configured to transmit radiation R between the wave-guiding element 400 and the photonic chip 200. The lens device 500 preferably comprises or consists of semiconductor material such as silicon. The wave-guiding element 400 and the lens device 500 are preferably fixed to each other and form a self-contained optical connector 450.

The optical assembly 10 of FIG. 1 further comprises a housing 600. The housing 600 has a first wall 601 that faces the first side 101 of the circuit board 100 and therefore the back side 202 of the photonic chip 200, and a second wall 602 that faces the second side 102 of the circuit board 100.

A first heat sink 610 is mounted on the back side 202 of the photonic chip 200 and coupled to the first wall 601. Therefore, heat Pth1 generated by the photonic chip 200 may flow through the first heat sink 610 towards the first wall 601.

A second heat sink 620 is mounted on the component 300 and thermally coupled to the front side 201 of the photonic chip 200. Hence, heat Pth2 generated by the photonic chip 200 and passing the component 300 and/or generated by the component 300 itself may flow through the hole 103 towards the second heat sink 620 and the second wall 602.

In the embodiment of FIG. 1, the component 300 is thermally active and generates heat itself. E.g. the component may be a light emitting device (e.g. LED or laser), an amplifier, or a photodetector.

Figure 2:
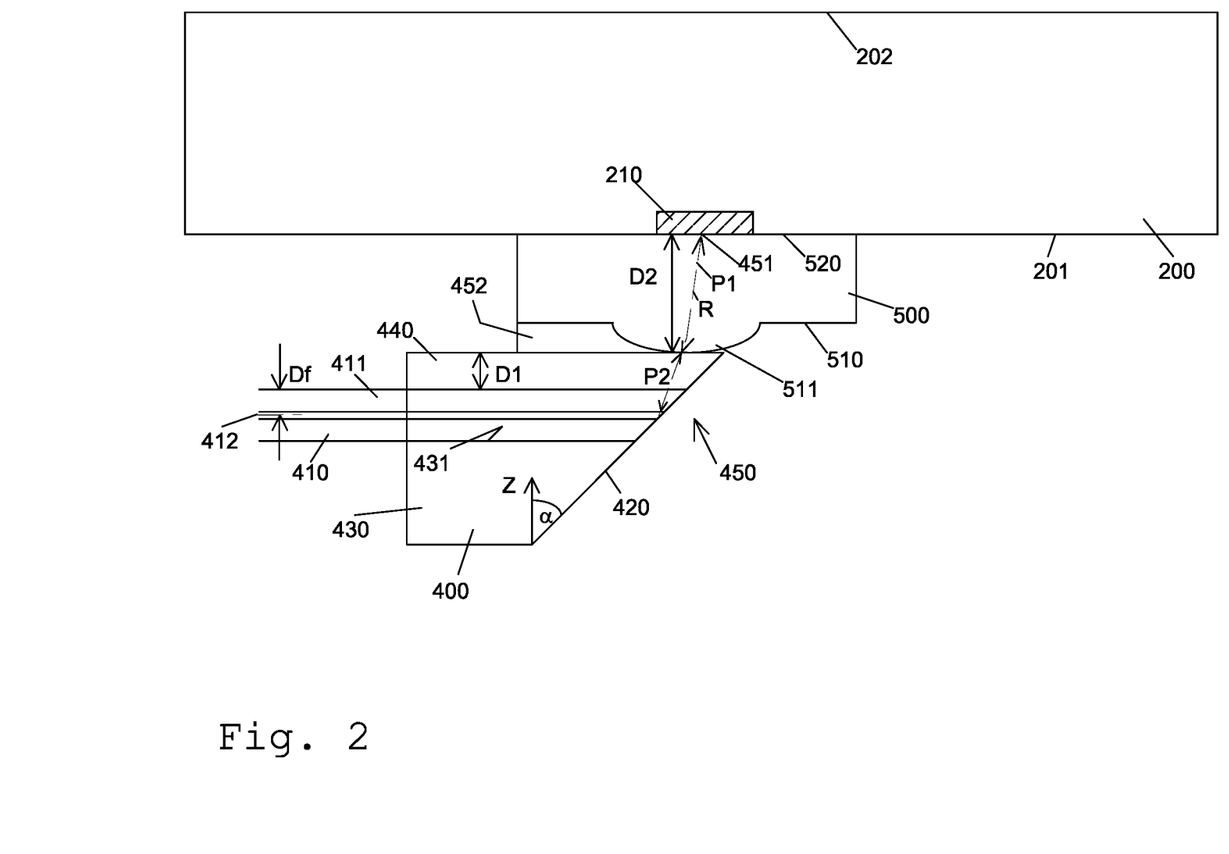
FIG. 2 illustrates an exemplary embodiment of a self-contained optical connector and a section of an exemplary embodiment of a photonic chip.

In order to minimize the size of the entire assembly 10, the lens device 500 and the wave-guiding element 400 are preferably arranged perpendicular to each other. The lens device 500 and the wave-guiding element 400 are preferably bracket-shaped, L-shaped or hook-shaped (as shown in FIG. 2 in the side view). Then the longitudinal axis of the wave-guiding element 400 may be arranged in parallel to the circuit board 100 resulting in minimum space requirements of the wave-guiding element 400. Further, the shape of the self-contained optical connector 450 allows the lens device 500 to provide a form-fitted mechanical anchorage point for the waveguiding-element 400 and a pull relief along the longitudinal axis of the wave-guiding element 400.

A gap between the inner wall of the hole 103 and the lens device 103 and/or a gap between the inner wall of the hole 103 and the component 300 and/or a gap between the lens device 103 and the component 300 are preferably filled with a filling material such as light or temperature curing adhesives, preferably based on epoxy resin or acrylates.

In the exemplary embodiment of FIG. 1, the hole 103 may provide one or more of the following advantages:

1) The hole 103 may provide coupling of optical radiation R to and/or from the wave-guiding element 400. Hence, the wave-guiding element 400 may be located on the second side 102 of the circuit board 100 and separated from the photonic chip 200 by the circuit board 100. This may result in reduced space requirements.

2) The hole 103 provides space for the component 300. This may result in reduced space requirements of the entire assembly.

3) The hole 103 may allow flowing of heat generated by the photonic chip 200 and/or the component 300 towards a heat sink that is located on the second side 102 of the circuit board 102 (i.e. on the other side compared to the photonic chip 200). Hence, one heat sink 610 may be located on the first side 101 of the circuit board 100 (i.e. the back side 202 of the photonic chip 200) and/or one heat sink 620 may be located on the second side 102 of the circuit board 100 (i.e. the front side 201 of the photonic chip 200).

4) The hole 103 may allow flowing of heat generated by the photonic chip 200 through the lens device 500 towards the waveguide-element 400 that may function as an additional heat sink.

The waveguide-element 400 may be thermally coupled to the second wall 602 of the housing 600.

5) The lens device 500 and the wave-guiding element 400 may be bracket-shaped, L-shaped or hook-shaped. Such a shape of the self-contained optical connector 450 may provide a form-fitted mechanical anchorage point inside the circuit board 100 for the waveguiding-element 400 as well as a pull relief along the longitudinal axis of the wave-guiding element 400.

FIG. 2 shows an exemplary embodiment of the self-contained optical connector 450 of FIG. 1 and a section of an exemplary embodiment of the photonic chip 200 of FIG. 1 in further detail (again not to scale).

The lens device 500 of the optical connector 450 is configured to transmit radiation R between the wave-guiding element 400 and one or more optical ports of the optical connector 450. To this end, the lens device 500 comprises a first outer surface 510 and a second outer surface 520 that is located opposite the first outer surface 510.

The first outer surface 510 is connected to the wave-guiding element 400 and forms one ore more lenses. One of the lenses 511 is shown in FIG. 2 in further detail. The lens 511 is preferably an aspheric lens formed by a convex surface section of the first outer surface 510. The first outer surface 510 may form a plurality of lenses, including lenses that differ from one another.

A section of the second outer surface 520 that is located directly opposite the lens 511 forms an optical port 451 of the optical connector 450.

Since the one or more lenses of the optical connector 450 are arranged internally between the lens device 500 and the wave-guiding element 400, the optical connector 450 may have a flat or plane second outer surface 520. A flat or plane second outer surface 520 facilitates the mounting of the optical connector 450 on the front side of the photonic chip 200. Further, a flat or plane second outer surface 520 facilitates a heat flow from the front side of the photonic chip 200 into the optical connector 450. Furthermore, positioning the lenses on the first surface instead of the second surface allows for more flexibility in the imaging of the radiation R, especially for the case of high beam divergence. The beam only propagates within the medium of the optical connector 450 and the photonic chip 200 and is not exposed to a gaseous medium like air.

The first outer surface 510 of the lens device 500 is preferably soldered or glued to the wave-guiding element 400 using solder or glue 452. Solder generally provides a good thermal conductivity and may be advantageous in order to ease a heat flow between the lens device 500 and the wave-guiding element 400, for instance if the optical connector 450 is meant to serve as an additional heat sink for heat coming from the photonic chip 200.

The wave-guiding element 400 comprises at least one fiber 410 and a facet 420. The facet 420 has an angle α between 44° and 55° relative to an axis Z that is perpendicular to the second outer surface 520. The facet 420 is capable of reflecting radiation R that enters the optical connector 450 at the second outer surface 520 and passes a cladding 411 of the fiber 410, into a core 412 of the fiber 410. The facet 420 is also capable of reflecting radiation R that propagates through the fiber's core 412 towards the facet 420, from the waveguide's core 412 into the fiber's cladding 411 and towards the second surface 520.

The wave-guiding element 400 further comprises a base element 430 having at least one groove 431. The fiber 410 is located in the groove 431 and covered by a lid 440. The first outer surface 510 of the lens device 500 is mounted to the lid 440 by means of the solder or glue 452 mentioned above.

The lid 440 preferably consists of semiconductor material such as silicon. Semiconductor material, in particular silicon, provides a low thermal resistance and allows a significant thermal heat flow from the photonic chip 200 through the lens device 500 into the wave-guiding element 400.

The thicknesses D1 of the lid 440 and the lens device 500 preferably fulfil the following equation:

$$D2/n2 = Df/nf + D1/n1$$

$$0.8 < D2/n2/(Df/nf + D1/n1) < 1.2$$

wherein
D1 describes the thickness of the lid 440,
n1 describes the refractive index of the lid 440,
D2 describes the thickness of the lens device 500,
n2 describes the refractive index of the lens device 500,
Df describes the distance between the center of the fiber's core 412 and the lid 440, and
nf describes the refractive index of the fiber's cladding 411.

As depicted in FIG. 2, the optical port 451 of the optical connector 450 is located adjacent to a coupling element 210 that is integrated in the photonic chip 200. The coupling element 210 is located on or near to the front side 201 of the photonic chip 200.

Regarding the coupling element 210 and the fiber 410, the following conditions are preferably met:

$$MFD1 * D2/n2 = MFD2 * (Df/nf + D1/n1)$$

$$0.8 < MFD1 * D2/n2 / (MFD2 * (Df/nf + D1/n1)) < 1.2$$

wherein
MFD1 describes the 1/e2-intensity related mode field diameter of the coupling element 210, and
MFD2 describes the 1/e2-intensity related mode field diameter of the fiber 410.

The ratio between the propagation length of a first optical path P1 that extends through the lens device 500, and the propagation length of a second optical path P2 that extends through the lid 440 and the waveguide's cladding 411 to the waveguide's core 412, is preferably between 1:1 and 3:1.

Figure 3:
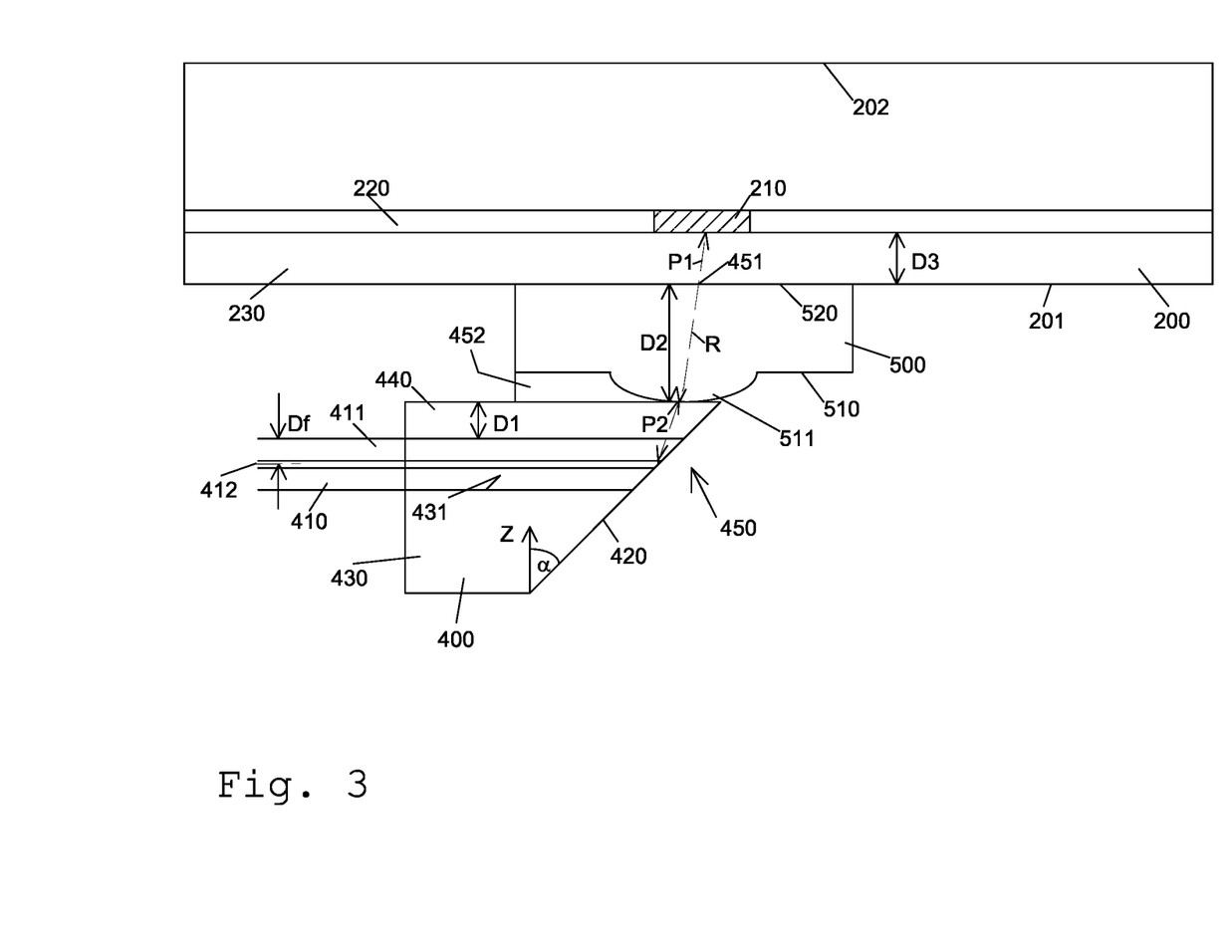
FIG. 3 illustrates the self-contained optical connector of FIG. 2 and a section of another exemplary embodiment of a photonic chip.

FIG. 3 shows the self-contained optical connector 450 of FIG. 1 in connection with another exemplary embodiment of the photonic chip 200 in further detail (again not to scale).

The photonic chip 200 of FIG. 3 comprises an inner wave-guiding layer 220 and a layer stack 230 that is located on top of the inner wave-guiding layer 220. The coupling element 210 is therefore separated from the front side 201 by the layer stack 230.

The lens device 500 is glued to the layer stack 230. The wave-guiding element 400 is optically coupled to the inner wave-guiding layer 220 via the integrated coupling element 210.

The ratio between the propagation length of a first optical path P1 that extends from the coupling element 210 through the layer stack 230 and the lens device 500 to the first surface 510 of the lens device 500, and the propagation length of a second optical path P2 that extends from the first surface 510 of the lens device 500 through the lid 440 and the fiber's cladding 411 to waveguide's core 412, is preferably between 1:1 and 3:1.

The thicknesses of the lid 440, the lens device 500 and the layer stack 230 preferably fulfil the following equations:

$$MFD1 * (D3/n3 + D2/n2) = MFD2 * (Df/nf + D1/n1)$$

$$0.8 < MFD1 * (D3/n3 + D2/n2) / (MFD2 * (Df/nf + D1/n1)) < 1.2$$

wherein
D1 describes the thickness of the lid 440,
n1 describes the refractive index of the lid 440,
D2 describes the thickness of the lens device 500,
n2 describes the refractive index of the lens device 500,
Df describes the distance between the center of the fiber's core 412 and the lid 440,
nf describes the refractive index of the fiber's cladding 411,
D3 describes the thickness of the layer stack 230,
n3 describes the refractive index of the layer stack 230,
MFD1 describes the 1/e2-intensity related mode field diameter of the coupling element 210, and
MFD2 describes the 1/e2-intensity related mode field diameter of the fiber 410.

Figure 4:
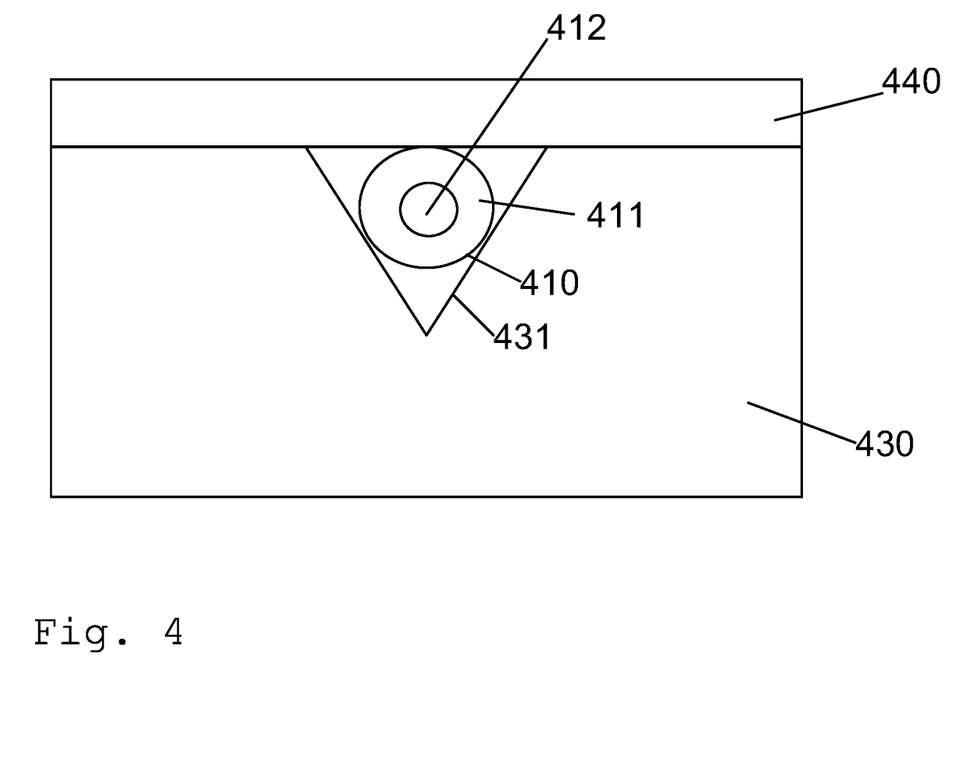
FIG. 4 illustrates an cross-section of a wave-guiding element of the self-contained optical connector of FIGS. 2 and 3.

FIG. 4 shows the wave-guiding element 400 of the self-contained optical connector 450 according to the embodiment of FIGS. 2 and 3 in a cross-section. FIG. 4 depicts the base element 430 and the groove 431. The fiber 410 is located in the groove 431 and covered by the lid 440.

Figure 5:
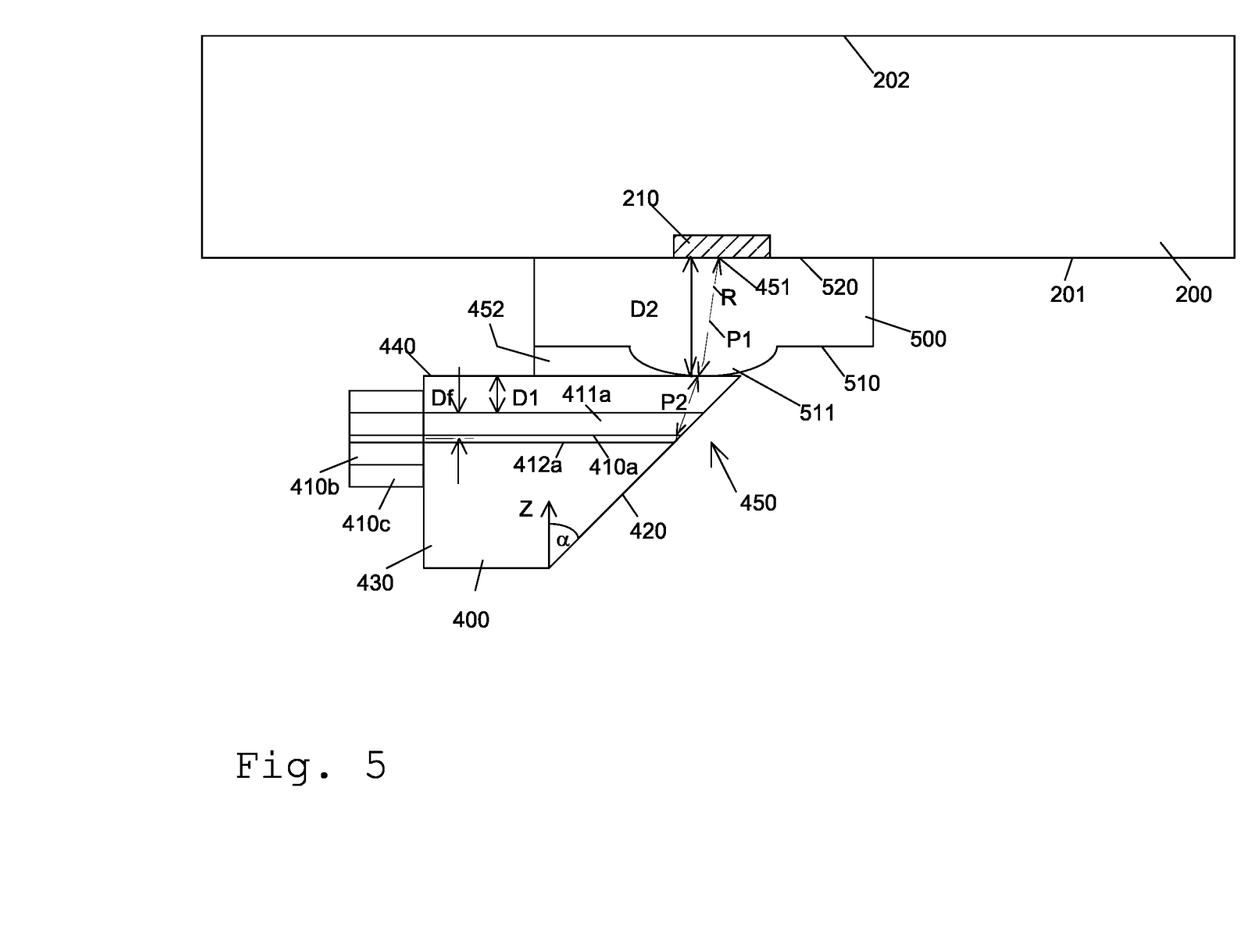
FIG. 5 illustrates another exemplary embodiment of a self-contained optical connector and a section of an exemplary embodiment of a photonic chip.

FIG. 5 shows another exemplary embodiment of the self-contained optical connector 450 of FIG. 1 (again not to scale). The optical connector 450 of FIG. 5 differs from the optical connector 450 of FIGS. 2-4 with regard to the wave-guiding element 400, only.

Figure 6:
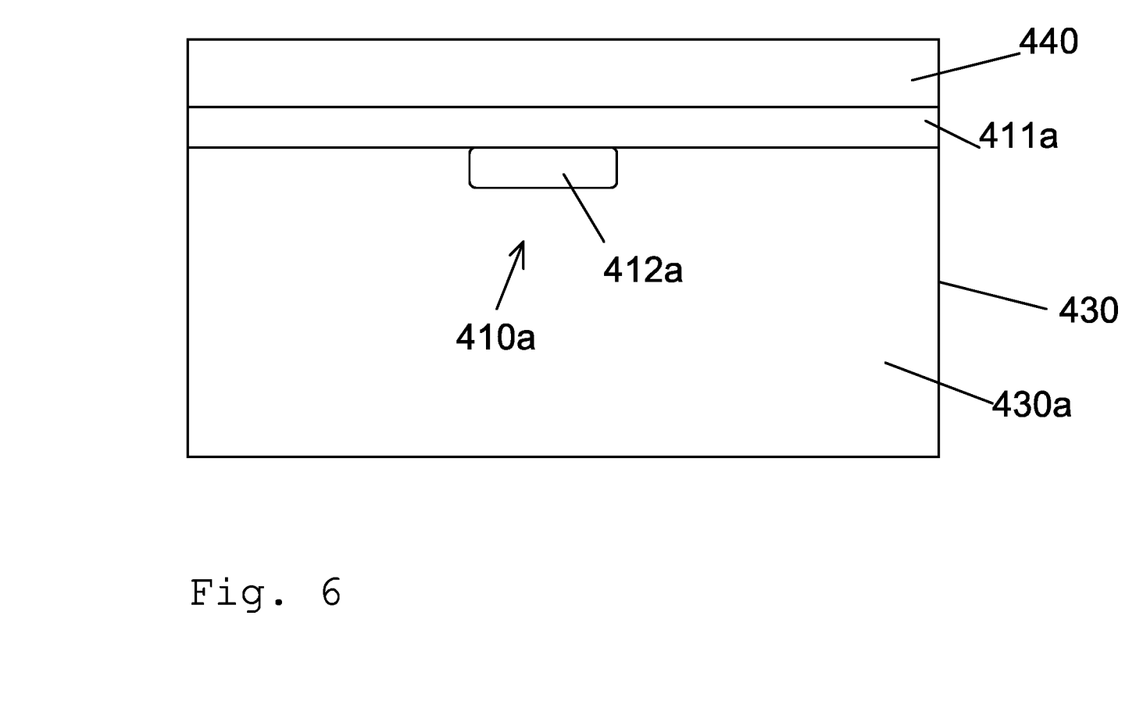
FIG. 6 illustrates a cross-section of a wave-guiding element of the self-contained optical connector of FIGS. 5 and 7.

The optical connector 450 of FIG. 5 comprises an integrated waveguide 410a that is integrated in the base element 430, for instance by ion implantation into a glass substrate 430a (see also the cross-section in FIG. 6). The region comprising the implanted ions forms the core 412a of the integrated waveguide 410a. The core 412a is covered by a region of the thin layer 411a of the base element 430 not comprising the implanted ions. The thin layer 411a is passed by the ions which reach deeper into the substrate 430a, and forms the cladding of the integrated waveguide 410a. The lid 440 is mounted on the surface of the thin layer 411a.

The integrated waveguide 410a is coupled to a fiber 410b that is embedded in a ferrule 410c. The ferrule is preferably fixed to the base element 430.

The thicknesses D1 of the lid 440 and the lens device 500 preferably fulfil the following equation:

$$D2/n2 = Df/nf + D1/n1$$

$$0.8 < D2/n2/(Df/nf + D1/n1) < 1.2$$

wherein
D1 describes the thickness of the lid 440,
n1 describes the refractive index of the lid 440,
D2 describes the thickness of the lens device 500,
n2 describes the refractive index of the lens device 500,
Df describes the distance between the center of the integrated waveguide's core 412a and the lid 440, and
nf describes the refractive index of the integrated waveguide's cladding 411a.

Regarding the coupling element 210 and the integrated waveguide 410a, the following conditions are preferably met:

$$MFD1 * D2/n2 = MFD2 * (Df/nf + D1/n1)$$

$$0.8 < MFD1 * D2/n2/(MFD2 * (Df/nf + D1/n1)) < 1.2$$

wherein
MFD1 describes the 1/e2-intensity related mode field diameter of the coupling element 210, and
MFD2 describes the 1/e2-intensity related mode field diameter of the integrated waveguide 410a.

The ratio between the propagation length of a first optical path P1 that extends through the lens device 500, and the propagation length of a second optical path P2 that extends through the lid 440 and the integrated waveguide's cladding 411 to the integrated waveguide's core 412, is preferably between 1:1 and 3:1.

Figure 7:
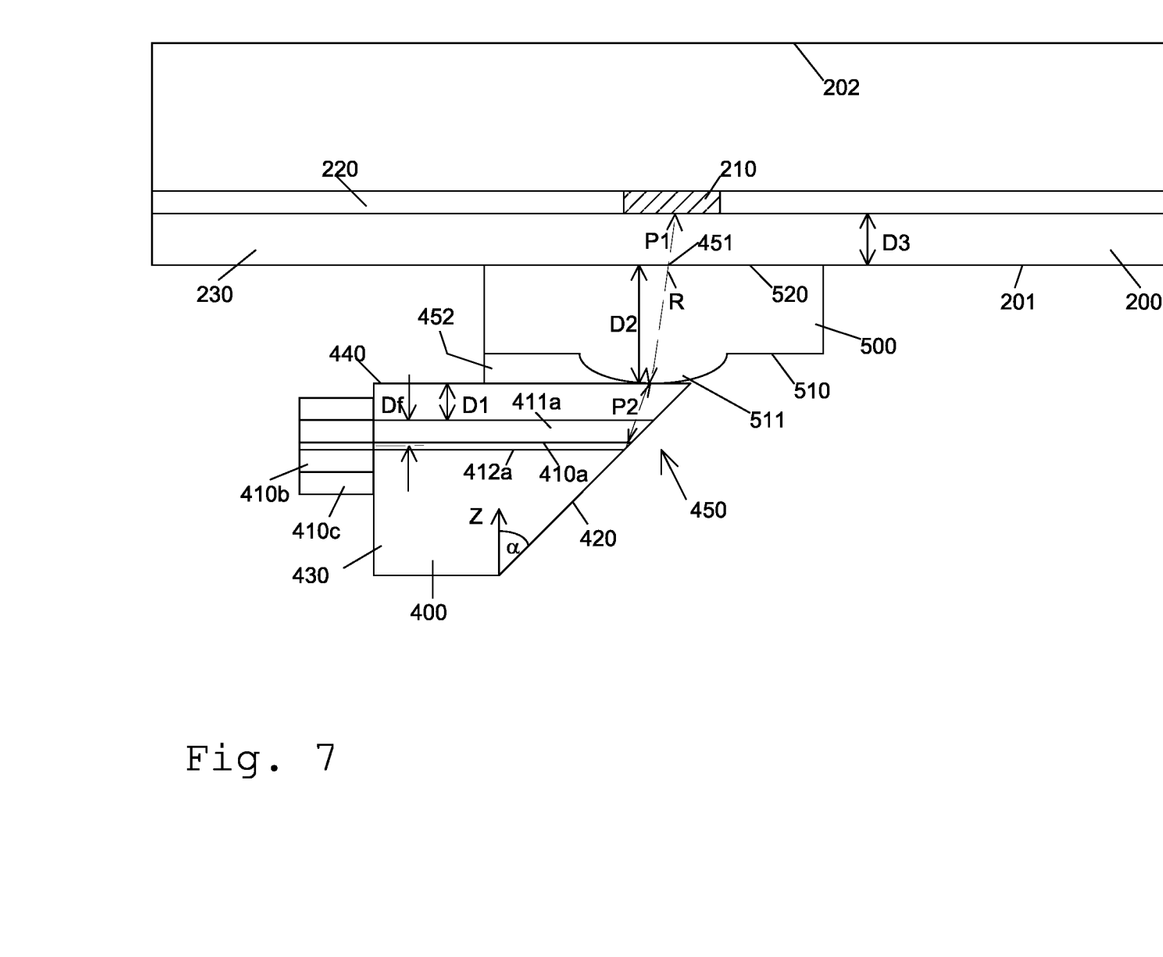
FIG. 7 illustrates the self-contained optical connector of FIG. 5 and a section of another exemplary embodiment of a photonic chip.

FIG. 7 shows the self-contained optical connector 450 of FIGS. 5 and 6 in connection with another exemplary embodiment of the photonic chip 200 in further detail (again not to scale).

The photonic chip 200 of FIG. 7 comprises an inner wave-guiding layer 220 and a layer stack (e.g. backend of line) 230 that is located on top of the inner wave-guiding layer 220. The coupling element 210 is therefore separated from the front side 201 by the layer stack 230.

The lens device 500 is glued to the layer stack 230. The wave-guiding element 400 is optically coupled to the inner wave-guiding layer 220 via the integrated coupler 210.

The ratio between the propagation length of a first optical path P1 that extends from the coupling element 210 through the layer stack 230 and the lens device 500 to the first surface 510 of the lens device 500, and the propagation length of a second optical path P2 that extends from the first surface 510 of the lens device 500 through the lid 440 and the integrated waveguide's cladding 411 to integrated waveguide's core 412, is preferably between 1:1 and 3:1.

The thicknesses of the lid 440, the lens device 500 and the layer stack 230 preferably fulfil the following equations:

$$MFD1 * (D3/n3 + D2/n2) = MFD2 * (Df/nf + D1/n1)$$

$$0.8 < MFD1 * (D3/n3 + D2/n2)/(MFD2 * (Df/nf + D1/n1)) < 1.2$$

wherein
D1 describes the thickness of the lid 440,
n1 describes the refractive index of the lid 440,
D2 describes the thickness of the lens device 500,
n2 describes the refractive index of the lens device 500,
Df describes the distance between the center of the integrated waveguide's core 412a and the lid 440, and
nf describes the refractive index of the integrated waveguide's cladding 411a.
D3 describes the thickness of the layer stack 230,
n3 describes the refractive index of the layer stack 230,
MFD1 describes the 1/e2-intensity related mode field diameter of the coupling element 210, and
MFD2 describes the 1/e2-intensity related mode field diameter of the integrated waveguide 410a.

Figure 8:
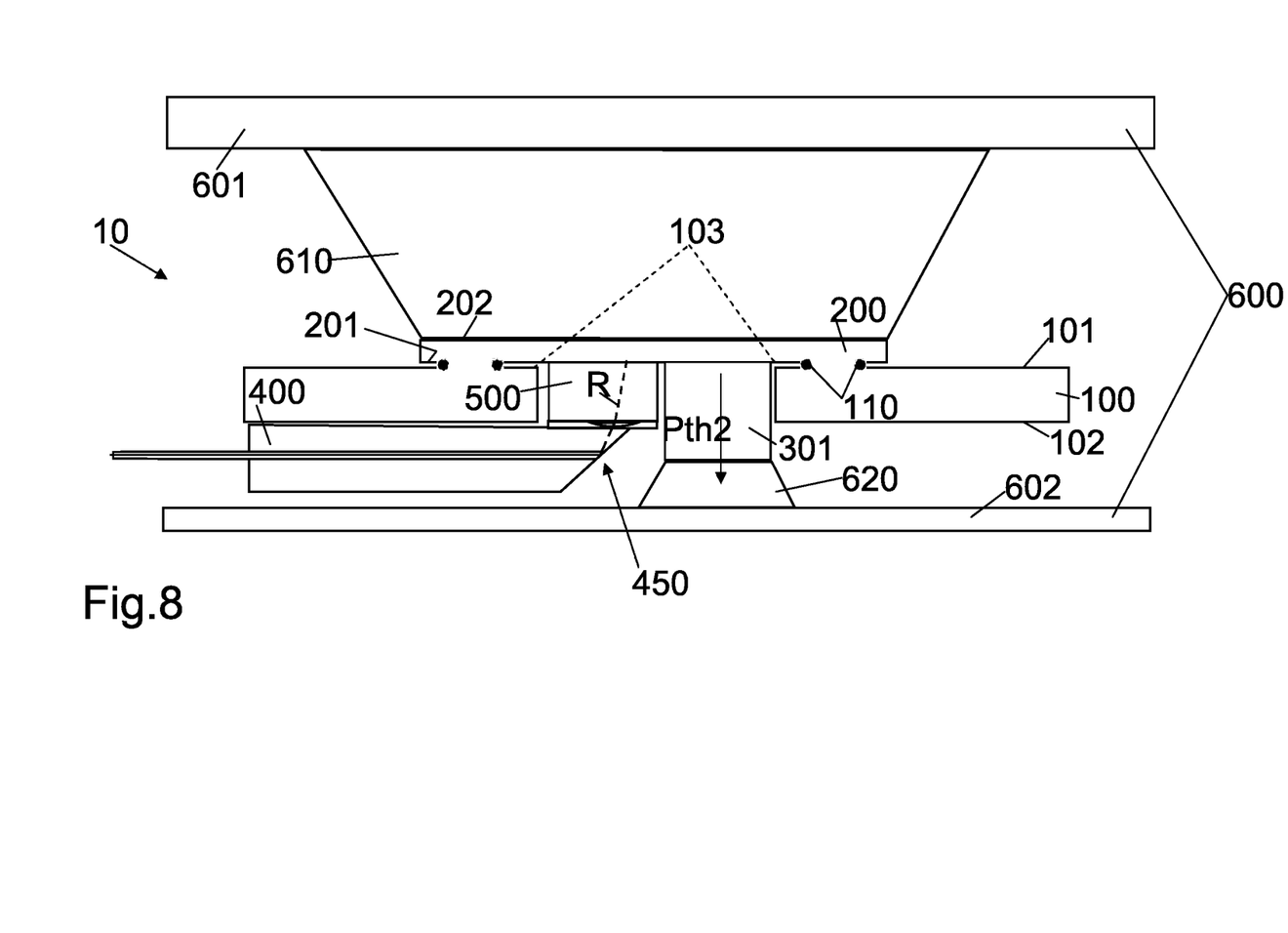
FIG. 8-11 illustrate further exemplary embodiments of optical assemblies according to the present invention.

FIG. 8 shows (not drawn to scale) a further exemplary embodiment of an optical assembly 10 according to the present invention. In the optical assembly 10 of FIG. 8, the component 301 is thermally passive and does not generate heat itself. However, the component 301 may form a thermal conductor that allows a thermal heat flow Pth2 towards the second heat sink 620. The component 301 may consist of or comprise metal and may form a heat spreader.

The other components of the optical assembly 10 of FIG. 8 may be identical with or correspond to the other components of the optical assemblies 10 of FIGS. 1-7. Hence, the explanations with regard to FIGS. 1-7 may also apply to the optical assembly 10 of FIG. 8.

Figure 9:
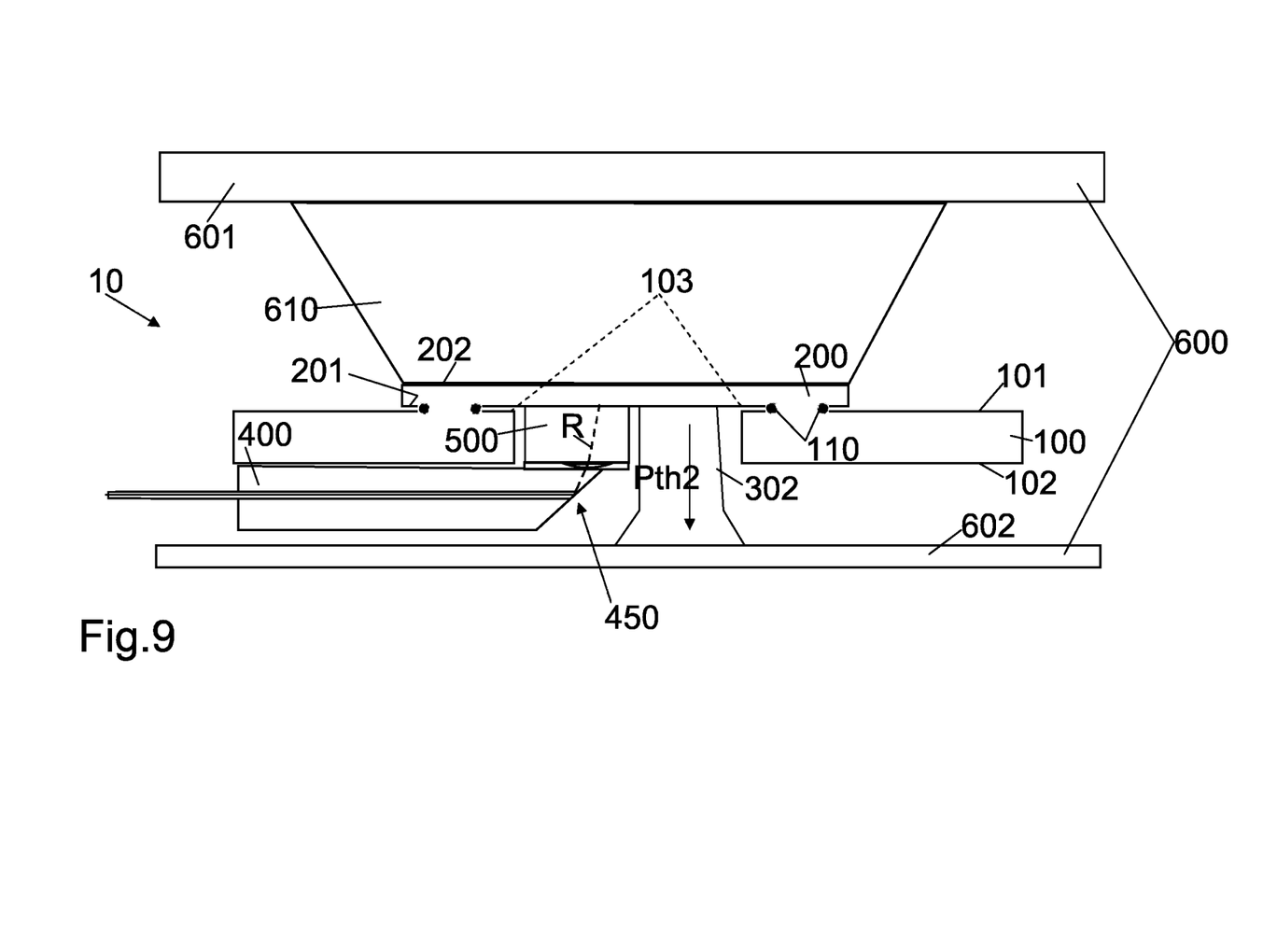

FIG. 9 shows (not drawn to scale) a further exemplary embodiment of an optical assembly 10 according to the present invention. In the optical assembly 10 of FIG. 9, the component 302 itself forms a second heat sink that is coupled with the second wall 602 of the housing 600.

The other components of the optical assembly 10 of FIG. 9 may be identical with or correspond to the other components of the optical assemblies 10 of FIGS. 1-8. Hence, the explanations with regard to FIGS. 1-8 may also apply to the optical assembly 10 of FIG. 9.

Figure 10:
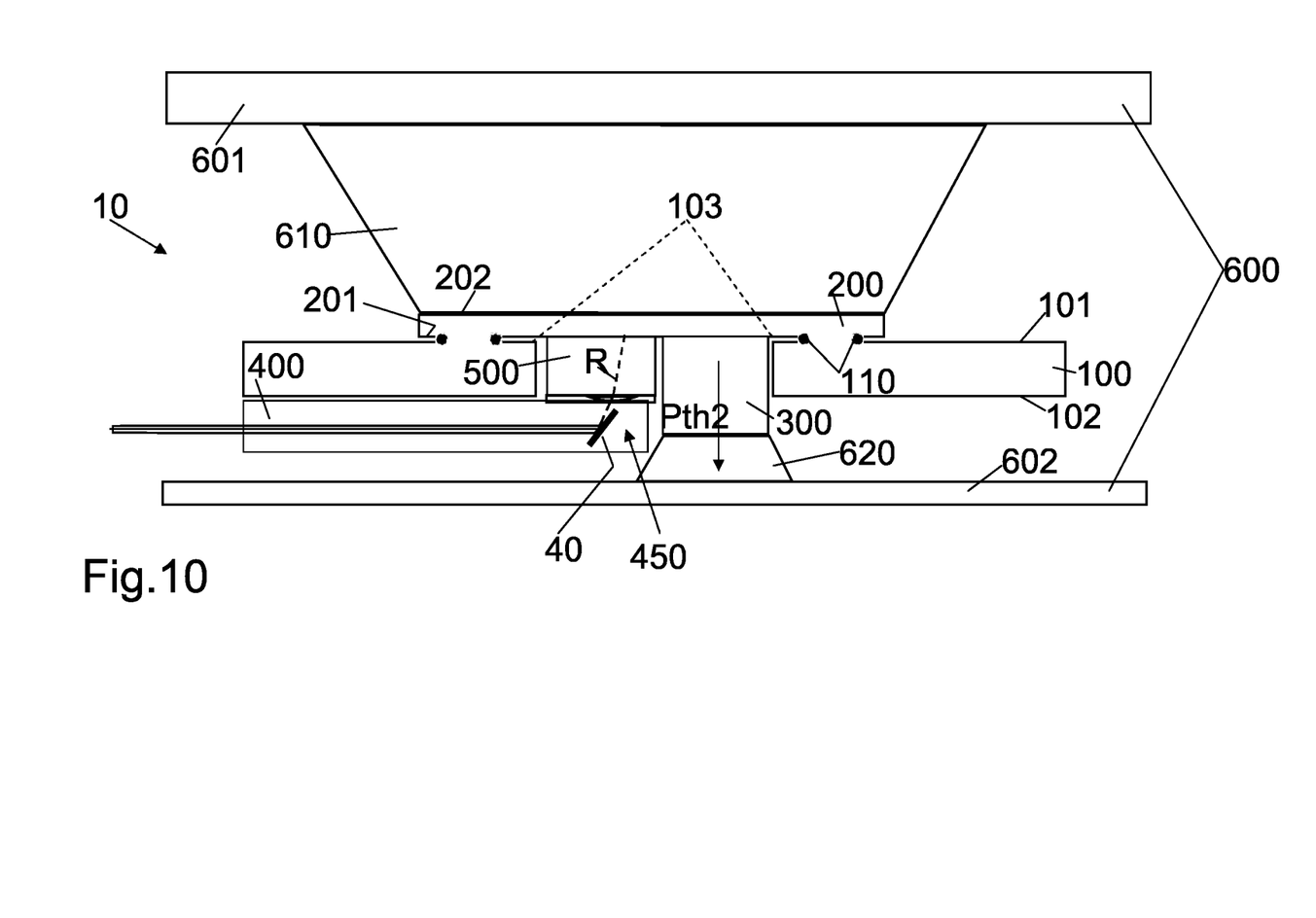

FIG. 10 shows (not drawn to scale) a further exemplary embodiment of an optical assembly 10 according to the present invention. In the optical assembly 10 of FIG. 10, the wave-guiding element 400 comprises an internal mirror 40. The mirror 40 preferably has an angle α between 44° and 55° relative to the axis Z that is perpendicular to the second outer surface 520 of the lens device 500 (see also FIG. 2). The mirror 40 is capable of reflecting radiation R similar to the facet 420 shown in FIG. 2.

The other components of the optical assembly 10 of FIG. 10 may be identical with or correspond to the other components of the optical assemblies 10 of FIGS. 1-9. Hence, the explanations with regard to FIGS. 1-9 also apply to the optical assembly 10 of FIG. 10. More specifically, the mirror 40 as shown in FIG. 10 may replace the facet 420 in the embodiments shown in FIGS. 2-7.

Figure 11:
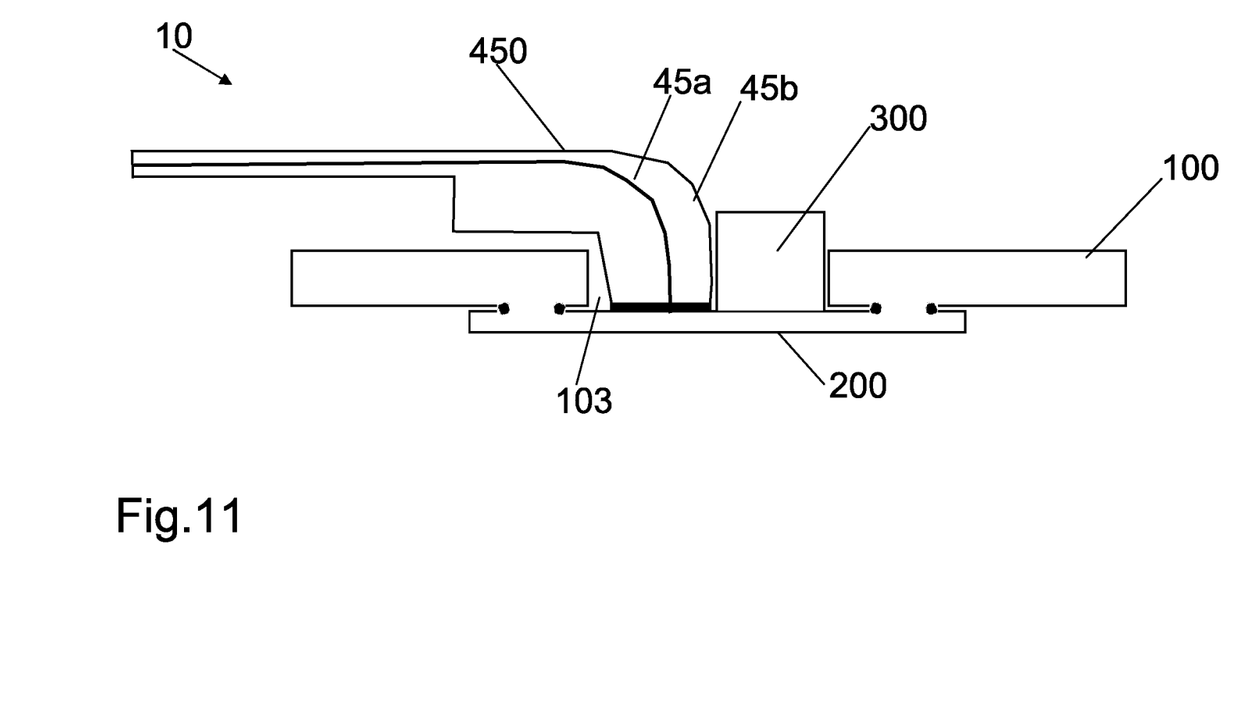

FIG. 11 shows (not drawn to scale) a further exemplary embodiment of an optical assembly 10 according to the present invention. In the optical assembly 10 of FIG. 11, the self-contained optical connector 450 is formed by or at least comprises a bent fiber 45a. The bent fiber 45a is preferably embedded in a cast holder 45b. The holder 45b preferably consists of or at least comprises glass or injection molded plastic or metal components.

The other components of the optical assembly 10 of FIG. 11 may be identical with or correspond to the other components of the optical assemblies 10 of FIGS. 1-10. Hence, the explanations with regard to FIGS. 1-10 also apply to the optical assembly 10 of FIG. 11.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the world "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one ore more) of the present dependent claims (regardless of the present claim structure). Therefore, the applicant may direct further patent claims towards other claim combinations at a later stage of the prosecution.

The invention claimed is:

1. Optical assembly comprising
a circuit board comprising a first side, a second side, and at least one hole that extends through the circuit board,
a photonic chip having a front side and a back side, the front side of the photonic chip being mounted on the first side of the circuit board and electrically connected to at least one electrical conductor of the circuit board,
at least one component being mounted on the front side of the photonic chip opposite the hole and protruding from the front side of the photonic chip into the hole or through the hole, and
a wave-guiding element that is located on the second side of the circuit board and optically coupled to the photonic chip through said hole.

2. Optical assembly of claim 1 further comprising
a first heat sink mounted to the back side of the photonic chip and
a second heat sink mounted on said component.

3. Optical assembly of claim 2 further comprising
a housing having a first wall that faces the first side of the circuit board and therefore the back side of the photonic chip, and a second wall that faces the second side of the circuit board,
wherein the first heat sink is coupled to the first wall and the second heat sink is coupled to the second wall, and
wherein heat generated by and/or passing the component flows through the hole and the second heat sink towards the second wall.

4. Optical assembly of claim 1 further comprising
a lens device located inside the hole,
wherein the lens device is configured to transmit radiation between the wave-guiding element and the photonic chip.

5. Optical assembly of claim 4,
wherein the lens device is located in said hole adjacent to said at least one component.

6. Optical assembly of claim 4,
wherein the wave-guiding element comprises a base element, an optical waveguide, and a lid covering the optical waveguide, and
wherein the lens device is located between the lid and the photonic chip.

7. Optical assembly of claim 6,
wherein the wave-guiding element comprises a facet having an angle between 44° and 55° relative to an axis that is perpendicular to the front side of the photonic chip, and
wherein said facet is capable of
reflecting radiation that originates from the photonic chip and passes the lid and a waveguide's cladding, into a waveguide's core and/or
reflecting radiation that propagates through the waveguide's core towards the facet, from the waveguide's core into the waveguide's cladding towards the lid and the photonic chip.

8. Optical assembly of claim 6,
wherein the lid consists of semiconductor material and
wherein a first outer surface of the lens device is soldered to the lid.

9. Optical assembly of claim 6,
wherein the ratio between the propagation length of a first optical path that extends through the lens device, and the propagation length of a second optical path that extends through the lid and the waveguide's cladding to the waveguide's core, is between 1:1 and 3:1.

10. Optical assembly of claim 6,
wherein the thicknesses of the lid and the lens device fulfil the following equation:

$$D2/n2 = Df/nf + D1/n1$$

$$0.8 < D2/n2/(Df/nf + D1/n1) < 1.2$$

wherein
D1 describes the thickness of the lid,
n1 describes the refractive index of the lid,
D2 describes the thickness of the lens device,
n2 describes the refractive index of the lens device,
Df describes the distance between the center of the waveguide's core and the lid, and
nf describes the refractive index of the waveguide's cladding.

11. Optical assembly of claim 6,
wherein a layer stack of the photonic chip is located on top of an inner wave-guiding layer of the photonic chip,
wherein a coupling element is integrated in the inner wave-guiding layer, and
wherein the ratio between the propagation length of a first optical path that extends from the coupling element through the layer stack and the lens device to a first surface of the lens device, and the propagation length of a second optical path that extends from the first surface of the lens device through the lid and the waveguide's cladding to waveguide's core, is between 1:1 and 3:1.

12. Optical assembly of claim 1,
wherein the lens device comprises a first outer surface and a second outer surface opposite the first outer surface,
wherein the first outer surface is connected to the wave-guiding element and the second outer surface is connected to the photonic chip, and
wherein the surface shape of the first surface forms at least one lens.

13. Optical assembly of claim 1,
wherein the photonic chip comprises an inner wave-guiding layer and an integrated coupler, and
wherein the wave-guiding element is optically coupled to the inner wave-guiding layer via the integrated coupler.

14. Optical assembly of claim 1,
wherein a layer stack of the photonic chip is located on top of an inner wave-guiding layer of the photonic chip, and
wherein the lens device is glued to the layer stack.

15. Optical assembly of claim 1,
wherein a layer stack of the photonic chip is located on top of an inner wave-guiding layer of the photonic chip,
wherein a coupling element is integrated in the inner wave-guiding layer, and
wherein the thicknesses of the lid, the lens device and the layer stack fulfil the following equations:

$$MFD1*(D3/n3+D2/n2)=MFD2*(Df/nf+D1/n1)$$

$$0.8<MFD1*(D3/n3+D2/n2)/(MFD2*(Df/nf+D1/n1))<1.2$$

wherein
D1 describes the thickness of the lid,
n1 describes the refractive index of the lid,
D2 describes the thickness of the lens device,
n2 describes the refractive index of the lens device,
D3 describes the thickness of the layer stack,
n3 describes the refractive index of the layer stack,
Df describes the distance between the waveguide's core and the lid,
nf describes the refractive index of the waveguide's cladding,
MFD1 describes the 1/e2-intensity related mode field diameter of a coupling element integrated in the inner wave-guiding layer of the photonic chip, and
MFD2 describes the 1/e2-intensity related mode field diameter of the waveguide.

16. Optical assembly of claim 1 wherein
the wave-guiding element comprises a fiber having a straight section that is parallel to the circuit board and located on the second side of the circuit board, and a bent section that protrudes into the hole towards the photonic chip.

17. Optical assembly of claim 16 wherein
an end facet of the bent section is glued to the photonic chip.

18. Optical assembly of claim 1 wherein
said at least one component is a radiation emitter, such as a laser or LED, an amplifier, or a photodetector.

19. Optical assembly of claim 1 wherein
wherein a gap between the inner wall of the hole and the lens device and/or a gap between the inner wall of the hole and the component and/or a gap between the lens device and the component is filled with a filling material.

20. Method of fabricating an optical assembly comprising the steps of:
forming at least one through-hole in a circuit board that comprises a first side and a second side,
mounting at least one component on a front side of a photonic chip,
mounting the photonic chip with its front side on the first side of the circuit board and electrically connecting at least one electrical contact of the photonic chip to least one electrical conductor of the circuit board, wherein the photonic chip is aligned such that said at least one component protrudes from the front side of the photonic chip into the hole or through the hole, and
arranging a wave-guiding element on the second side of the circuit board and optically coupling the wave-guiding element to the photonic chip by forming an optical path through said hole.

* * * * *